Figure 1:
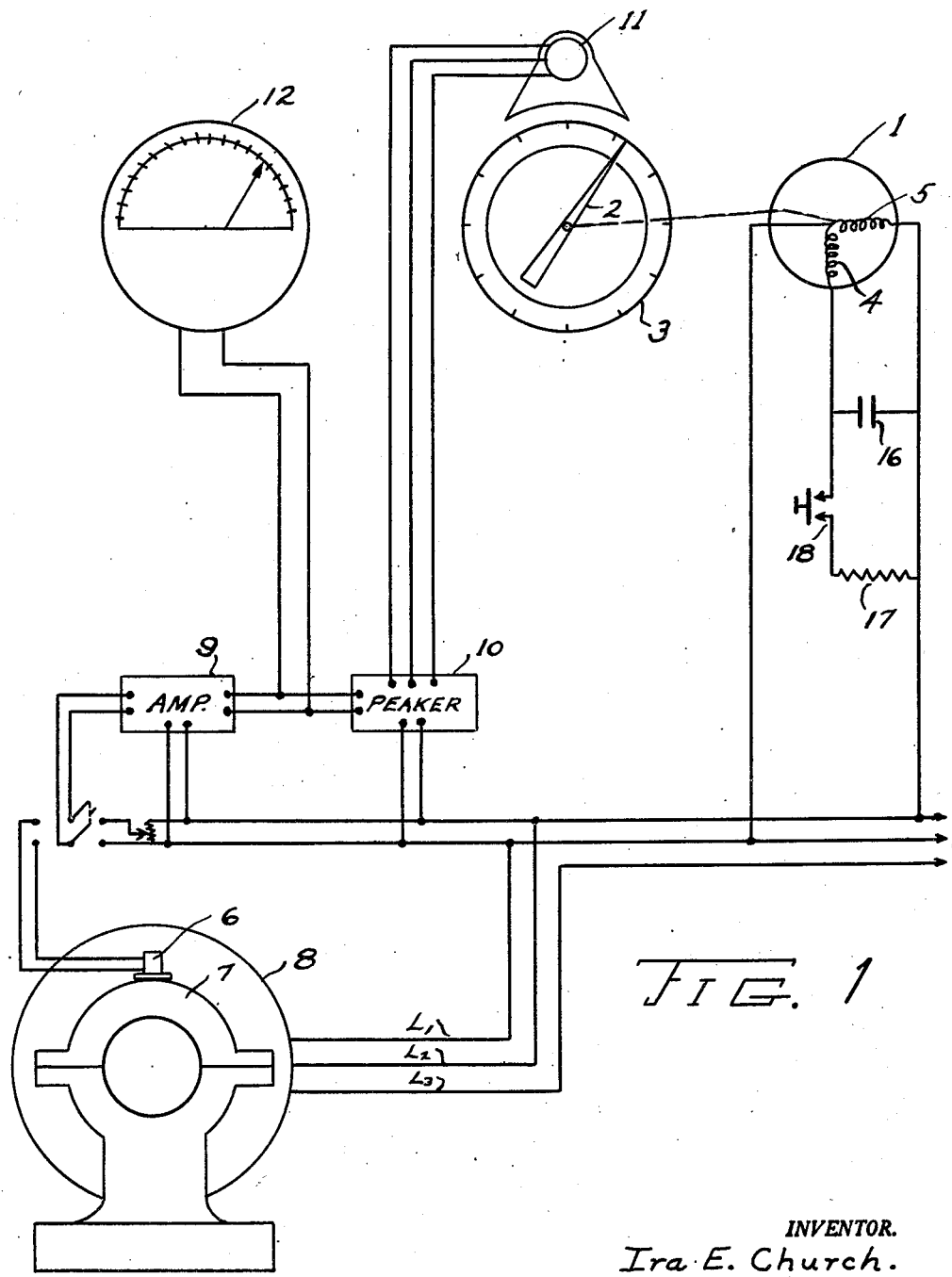

INVENTOR.
Ira E. Church.

INVENTOR.
Ira E. Church.
BY William J. Ruano
ATTORNEY.

United States Patent Office 2,709,913
Patented June 7, 1955

2,709,913

BALANCING DEVICE WITH MEANS FOR MEASURING THE RELATIVE PHASE ANGLE OF A. C. VOLTAGES

Ira E. Church, Redondo Beach, Calif.

Application November 15, 1954, Serial No. 468,599

4 Claims. (Cl. 73—66)

My invention relates to a control system and apparatus for obtaining data which is useful in balancing synchronous machinery, remote from the machine under test, such as steam turbine operated generators and synchronous motors.

A common procedure heretofore used in balancing rotating machinery is to obtain vector values of vibration by placing trial weights in prepared locations on the rotor. By taking readings of vibration amplitude and relative phase angle of the vibrations, before and after installing the trial weights, vector values are obtained which can be graphically represented on a circular co-ordinate chart, from which information is obtainable for balancing. This procedure is well known to those versed in the art of balancing, therefore further explanation is deemed unnecessary.

Various methods for obtaining the phase angle of vibration voltages have been used in the past. One method is to employ a stroboscopic light to flash once every revolution to illuminate markings on a shaft which apparently stands still under this type of illumination. The flashes can be controlled by a breaker head rotated by the shaft under observation, or a strobotron can be triggered by the voltage generated by a vibration pick-up. The electronic circuits necessary for this latter method are well known.

An outstanding disadvantage of presently known systems for obtaining vibration data is that it is necessary to obtain such data in proximity to the machine under test, thereby usually necessitating that the operator work in an undesirable location which is noisy, and inconvenient. In some cases it is impossible to get access to the shaft when in operation.

An object of my invention is to provide a novel method and system overcoming the above named disadvantages of those conventionally used, whereby readings can be taken remote from the machine under test, such as in the control room of a power house. In this case vibration pick-ups are mounted permanently on all bearings of a synchronous unit with leads extended to a panel on which are mounted a vibration meter and phase angle indicator. The operator then can take periodic readings of the amplitude and phase angle of each bearing and compare them with previous readings. Any change in reading will indicate some undesirable condition, such as loss of weight or bearing trouble. This is especially valuable for checking unattended or closed machines, such as outdoor type of equipment.

Another object of my invention is to provide a relatively simple, inexpensive and highly reliable and accurate system for dynamically balancing a machine in a minimum of time and involving simple operations.

Briefly, the equipment in accordance with my invention, consists of a motor, operating in synchronism with the machine under test, by being connected to the same electric circuit. A pointer on the shaft of this motor travels over a dial marked in degrees 0 to 360. This dial and pointer are illuminated by a stroboscopic lamp triggered by the voltage generated by a vibration pick-up. Thus the pointer will apparently stand still at a point on the dial relative to the peak of the vibration wave of the voltage generated by the pick-up. Thus the same relative reading is obtained as if the shaft of the machine under test were being observed.

Other objects and advantages of the present invention will become apparent from a study of the following description taken with the accompanying drawing wherein:

Figure 1 is a schematic diagram of a balancing device for measuring relative the phase angle of A. C. voltages and embodying the principles of my invention; and Figure 2 is a circuit diagram of one form of amplifier and peaker which may be used in the system shown in Figure 1, being understood that other amplifiers and peakers which are well known in the television and radar art may be used instead.

Figure 2:
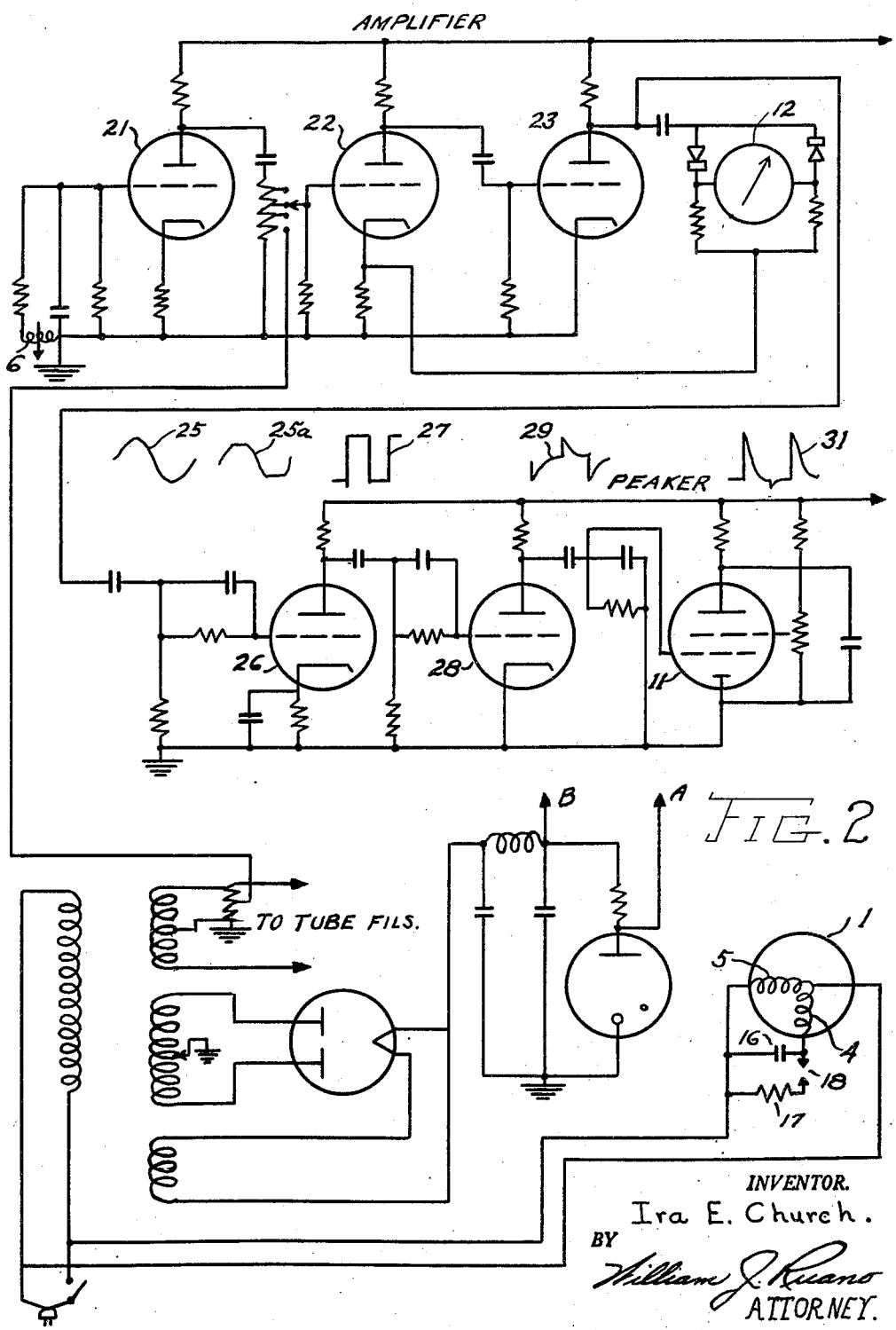

Referring more particularly to Figures 1 and 2, numeral 1 denotes a synchronous motor having rigidly secured to its shaft, a pointer 2. Cooperating with pointer 2 is a dial 3 marked in degrees and stationarily mounted concentrically with the motor shaft. A single phase motor is used having a two phase winding 4—5.

The pick-up coil 6 is of the velocity type, that is of the type wherein a coil is vibrated in the air gap of a magnet, thus generating a sine wave voltage. More specifically, such velocity type pick-up coil 6 is mounted on the bearing support 7 of a machine 8 to be tested in such a manner as to generate a voltage in proportion to the velocity of vibration thereof. The machine 8 is energized by a 3 phase, 60 cycle power source L1, L2, L3, across two of which terminals motor 1 is connected. The voltage generated by the pick-up coil 6 is fed through an amplifier 9 into a second electronic unit 10 which may be termed a peaker, since it changes the amplified sine wave voltage into sharp or peaked pulses for triggering the strobotron tube 11, causing it to flash and periodically illuminate the dial 3 and pointer 2. The vibration meter 12 is a standard D. C. instrument for reading the amplified voltage built up in the amplifier 9.

Since the standard frequency for alternating current power sources in the United States is 60 cycles, the highest speed of any synchronous equipment is necessarily 3600 R. P. M. Therefore a 3600 R. P. M. motor is used to take readings of any synchronous machine operating at that speed and 1800 R. P. M. motor for machines operating at 1800 R. P. M. etc.

For convenience, a single phase motor 1 is used, having a two phase winding. One winding is in series with a condenser 16 to obtain an out of phase voltage necessary for starting. The resistance 17 and push button 18 are used to cause the motor to slip a pole in case it comes into synchronism out of phase. Phasing of the motor 1 is accomplished by substituting, for the pick-up voltage, a test voltage from the same source as supplied to the terminals of the motor 1. The pointer is so attached to the motor shaft so it will read 0 or 180 degrees with this connection. Should the motor 1 come into synchronism with the pointer 2 showing at 180 degrees, the push button 18 is pushed momentarily, shorting the condenser 16 with the resistance 17, causing the motor to slip a pole. The pointer 2 will then read 0. This is a necessary preliminary operation each time the motor 1 is started. With the motor thus operating, any other voltage of the same frequency connected to trigger the strobotron, will cause the pointer 2 to read the phase angle difference between it and the voltage at the motor terminals. Thus the phase angle difference between the voltages generated by any number of vibration pick-ups is obtained by successively connecting each to cause the strobotron to flash at a point relative to the peak of the voltage wave caused by the vibration of the pick-up. It is obvious that any two or more A. C. voltages can thus be compared.

Various well-known types of amplifiers and peakers, such as those used in the television and radar field, may be used in the circuit shown in Figure 1. The purpose of the amplifier is to provide an amplified sine wave voltage. This sine wave voltage then passes through the peaker wherein its wave form is squared, clipped and peaked to change it into a wave form suitable for firing the strobotron tube.

One form of amplifier and peaker circuit is shown in Figure 2 and comprises amplifier tubes 21, 22 and 23 which amplify the sine wave signal produced in the vibration pick-up coil 6. The amplifier output, which is an amplified sine wave voltage of the form shown at 25, is fed through a network of condensers and resistances which clips the peaks of the sine waves and results in the wave form shown at 25a which is fed into the grid of tube 26 of the peaker circuit, which tube 26 through another network in the output thereof converts the sine wave into a square wave 27, which square wave is converted, by tube 28 through another network in the output thereof into a wave somewhat of the form shown at 29, and the latter provides a trigger voltage which is fed into the grid of a strobotron tube 11 which fires only on positive peaks, and has a wave form as shown at 31. The flashes of the strobotron tube 11 illuminate the dial 3 periodically so as to make it appear that pointer 2 is stationary. It will be readily apparent that other well-known amplifier and peaker circuits may be used instead.

A favored procedure, in balancing rotating machinery, is to get vector values of vibration by placing trial weights in prepared locations on the rotor to be balanced. By taking readings of vibration amplitude and relative phase angle of the vibrations, before and after installing the trial weights, vector values are obtained which can be graphically represented on a circular coordinate chart. This procedure is well known to those versed in the art of balancing hence further explanation is deemed unnecessary.

Thus the above decribed circuit, briefly, provides a synchronous motor operating in synchronism with the machine under test by being connected with the same circuit but being remotely positioned with respect to such machine, and having a calibrated dial over which a pointer on the shaft of this motor travels, whereby upon illumination of the dial by a stroboscopic lamp triggered by the voltage generated by a vibration pick-up coil, the pointer will apparently stand still at a point on the dial relative to the peak of the vibration wave of the voltage generated by the pick-up coil. Thus the same relative reading is obtained as if the shaft of the machine under test were being observed.

Thus it will be seen that I have provided an efficient apparatus and system for obtaining readings and balancing data at a point remote from the machine to be balanced, such as in the control room of a power house, or in an indoor location for outdoor machinery; furthermore, I have provided a system for quickly and visually observing the phase angle between vibration voltages by means of a storboscope in association with the additional synchronous motor rotating at the same frequency as the machine under test.

While I have illustrated and described an embodiment of my invention, it will be understood that this is by way of illustration only, and that various changes and modifications may be made within the contemplation of my invention and within the scope of the following claims.

I claim:

1. Apparatus for obtaining data for balancing a synchronous machine, comprising a vibration pick-up coil mounted on said machine, a three phase source of A. C. electrical potential for energizing said machine, a synchronous motor remotely situated with respect to said machine and energized by said source, a stationary dial fixed with respect to the frame of said motor, a pointer secured to the shaft of said motor and cooperable with said dial, a stroboscope for periodically illuminating said dial and pointer, an amplifier for amplifying signals from said pick-up coil, a vibration meter connected to the output of said amplifier, and a peaking circuit for converting said signals to suitable signals for triggering said stroboscope, whereby the amplitude and relative phase angle of A. C. voltage signals from said pick-up coil may be read at a remote distance from said machine.

2. Apparatus for obtaining data for balancing a synchronous machine, comprising a vibration pick-up coil of the velocity type for generating a voltage in proportion to the velocity of vibration thereof when mounted on said machine, a three phase source of A. C. electrical potential for energizing said machine, a single phase synchronous motor remotely situated with respect to said machine and energized by one of the phases of said source, a stationary dial mounted on said motor, a pointer secured to the shaft of said motor and cooperable with said dial, a stroboscope for periodically illuminating said dial and pointer, an amplifier for amplifying signals generated in said pick-up coil, a circuit for converting said signals to suitable signals for triggering said stroboscope, whereby the relative phase angle of A. C. voltage signals in said pick-up coil may be read at a remote distance from said machine.

3. Apparatus for reading the phase angle of an A. C. voltage relative to the phase angle of a known voltage, comprising a single phase synchronous motor energized by the same A. C. terminals as a three phase synchronous machine under test, a velocity type vibration pick up coil mounted on the bearing of said machine under test, a stationary dial mounted concentrically with respect to the shaft of said motor, an indicator on said shaft, an amplifying and peaking circuit connected to said coil, a stroboscope connected to the output of said peaker for periodically illuminating said dial and indicator, and a vibration meter connected to the output of said amplifier.

4. Apparatus as recited in claim 2 together with a condenser in series with one of the phase windings of said motor, a resistance and a serially connected switch bridging said condenser for temporarily shorting it upon closing of the switch to permit said motor to slip a pole when 180° out of phase with said machine.

References Cited in the file of this patent

UNITED STATES PATENTS

| | | |
|---|---|---|
| 1,864,627 | Aronoff | June 28, 1932 |
| 2,092,096 | Swedlund | Sept. 7, 1937 |
| 2,165,024 | Baker et al. | July 4, 1939 |
| 2,204,260 | Smith | June 11, 1940 |
| 2,521,141 | Allen | Sept. 5, 1950 |
| 2,693,991 | Holtz | Nov. 9, 1954 |